(12) United States Patent
Beacham et al.

(10) Patent No.: US 10,751,798 B2
(45) Date of Patent: Aug. 25, 2020

(54) SYSTEM AND METHOD FOR ADDITIVELY MANUFACTURING AN OBJECT

(71) Applicant: GENERAL ELECTRIC COMPANY, Schenectady, NY (US)

(72) Inventors: Jimmie Beacham, West Allis, WI (US); Philip Luk, Buckeye, AZ (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 387 days.

(21) Appl. No.: 15/626,310

(22) Filed: Jun. 19, 2017

(65) Prior Publication Data
US 2018/0361473 A1    Dec. 20, 2018

(51) Int. Cl.
| | |
|---|---|
| *B22F 3/105* | (2006.01) |
| *B33Y 10/00* | (2015.01) |
| *B33Y 30/00* | (2015.01) |
| *B33Y 40/00* | (2020.01) |
| *B33Y 50/02* | (2015.01) |
| *C23F 1/02* | (2006.01) |
| *C23F 1/44* | (2006.01) |
| *C23F 1/08* | (2006.01) |
| *B22F 3/24* | (2006.01) |

(52) U.S. Cl.
CPC ............ *B22F 3/1055* (2013.01); *B33Y 10/00* (2014.12); *B33Y 30/00* (2014.12); *B33Y 40/00* (2014.12); *B33Y 50/02* (2014.12); *C23F 1/02* (2013.01); *C23F 1/08* (2013.01); *C23F 1/44* (2013.01); *B22F 2003/1057* (2013.01); *B22F 2003/1058* (2013.01); *B22F 2003/244* (2013.01); *B22F 2999/00* (2013.01)

(58) Field of Classification Search
None
See application file for complete search history.

(56) References Cited

U.S. PATENT DOCUMENTS

| | | | |
|---|---|---|---|
| 5,461,769 A | 10/1995 | McGregor | |
| 2011/0241947 A1* | 10/2011 | Scott | B29C 67/0085 343/700 MS |
| 2016/0031010 A1* | 2/2016 | O'Neill | B29C 64/153 419/28 |
| 2016/0349215 A1 | 12/2016 | Todorov | |
| 2018/0214947 A1* | 8/2018 | Haro Gonzalez | B22F 3/1055 |

* cited by examiner

*Primary Examiner* — Colin W. Slifka
(74) *Attorney, Agent, or Firm* — Christopher R. Carroll; The Small Patent Law Group LLC

(57) ABSTRACT

A method for additively manufacturing an object is provided. The method includes forming the object on a sacrificial layer of a substrate such that the object is secured to a base layer of the substrate via the sacrificial layer. The method further includes removing at least some of the sacrificial layer from the substrate so that the object is no longer secured to the base layer.

20 Claims, 4 Drawing Sheets

SYSTEM AND METHOD FOR ADDITIVELY MANUFACTURING AN OBJECT

BACKGROUND

Technical Field

Embodiments of the invention relate generally to manufacturing, and more specifically, to a system and method for additively manufacturing an object.

Discussion of Art

Additive manufacturing, also known as three-dimensional ("3D") printing, is a process of constructing a 3D component by printing two-dimensional ("2D") layers of the component from a forming material, i.e., plastic and/or metal, and then joining/binding the 2D layers together via an adhesive or other suitable method, e.g., welding. Many additive manufacturing systems typically print the 2D layers of a component onto a substrate such that the component is physically attached to the substrate. After the final 2D layer has been printed, the component is then usually mechanically separated, e.g., cut, sawed, snapped, from the substrate. For example, many additive manufacturing systems separate completed components from a substrate via electrical discharge machining ("EDM"). Many traditional approaches to separating components from a substrate, however, are often time consuming and labor intensive.

Further, mechanically separating a component from a substrate usually results in some of the forming material remaining attached to the substrate. As such, many additive manufacturing systems build a foundation segment into the base of the component so that the actual dimensions of the component remain substantially in conformance with the specified dimensions of the component after having been mechanically separated from the substrate. Such foundation segments, however, consume amounts of the forming material that could have otherwise been used to make additional components.

Additionally, the separated component must usually be further processed to smooth and/or otherwise mitigate inconsistencies between the actual dimensions of the component, after separation, and the specified dimensions of the component. For example, portions of the foundation segment remaining attached to the component after mechanical separation from the substrate may need to be removed from the component and/or finished, e.g., smoothed. Such post mechanical separation processing of a component, however, is typically time consuming, labor intensive, and/or expensive. Further, mechanical separation of a component from a substrate risks damaging the component and/or substrate.

Moreover, generally, forming material remaining on the substrate after separation of a component must be removed from the substrate prior to reuse of the substrate, i.e., the substrate must be "cleaned." Traditional methods of cleaning a substrate involve ablating and/or grinding the remaining material off of the substrate. Such traditional methods of cleaning substrates, however, are often labor intensive, time consuming, and monetarily expensive.

What is needed, therefore, is an improved system and method for additively manufacturing an object.

BRIEF DESCRIPTION

In an embodiment, a method for additively manufacturing an object is provided. The method includes forming the object on a sacrificial layer of a substrate such that the object is secured to a base layer of the substrate via the sacrificial layer. The method further includes removing at least some of the sacrificial layer from the substrate so that the object is no longer secured to the base layer.

In another embodiment, a system for additively manufacturing an object is provided. The system includes a substrate, a mobile print head, and a controller. The substrate includes a sacrificial layer disposed on a base layer and is operative to provide a foundation upon which to form the object. The mobile print head is operative to move in relation to the substrate. The controller is in electronic communication with the print head and operative to form the object on the sacrificial layer via the mobile print head such that the object is secured to the base layer via the sacrificial layer. At least some of the sacrificial layer is configured to be removed from the substrate such that the object is no longer secured to the base layer.

In yet another embodiment, a non-transitory computer readable medium storing instructions is provided. The stored instructions are configured to adapt a controller to form an object on a sacrificial layer of a substrate via a print head in electronic communication with the controller such that the sacrificial layer secures the object to a base layer of the substrate, and to remove a portion of the sacrificial layer from the substrate via an etching device in electronic communication with the controller. The object is no longer secured to the base layer when the portion of the sacrificial layer has been removed from the substrate.

In yet still another embodiment, a substrate for additively manufacturing an object is provided. The substrate includes a base layer operative to provide a foundation upon which to form the object, and a sacrificial layer disposed on the base layer and operative to secure the object to the base layer. At least some of the sacrificial layer is configured to be removed from the substrate such that the object, after having been formed, is no longer secured to the base layer.

DRAWINGS

The present invention will be better understood from reading the following description of non-limiting embodiments, with reference to the attached drawings, wherein below:

DETAILED DESCRIPTION

Figure 1:
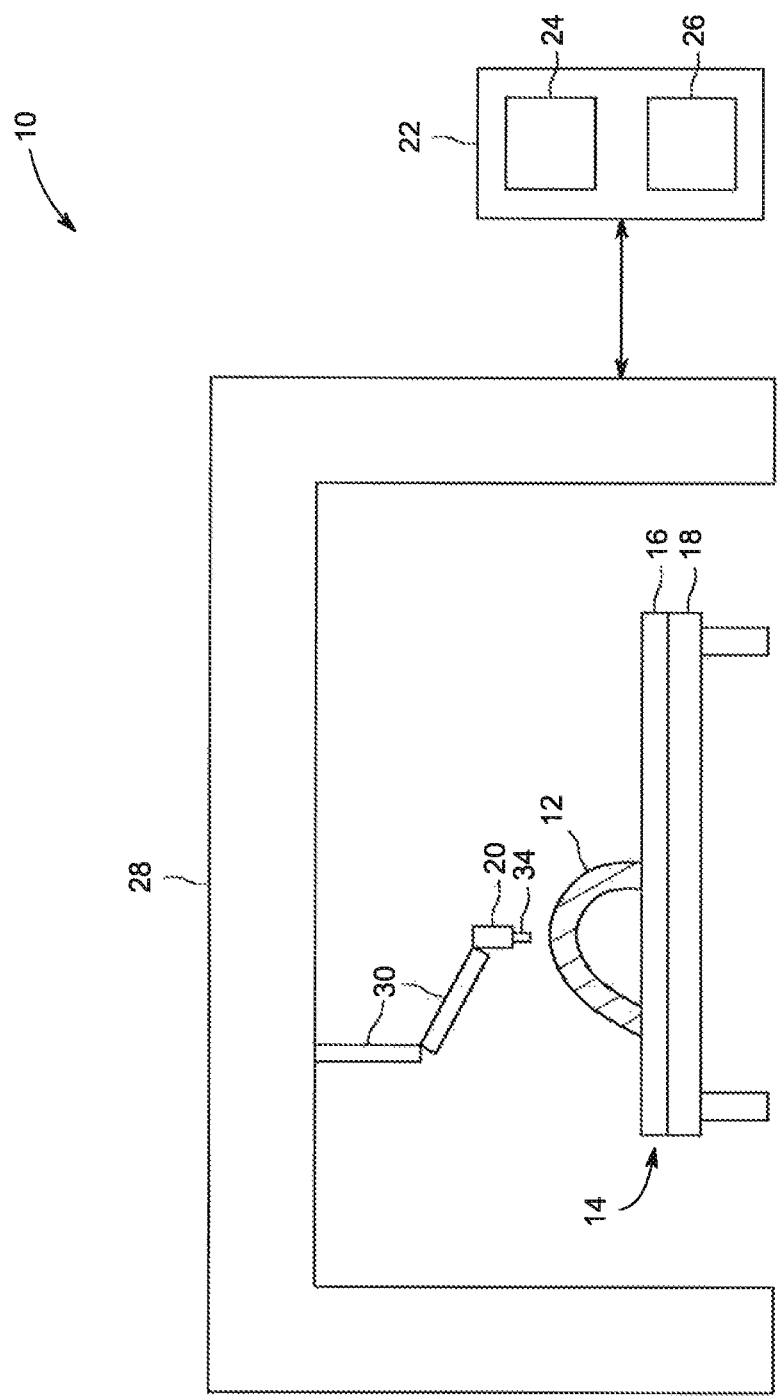
FIG. 1 is a diagram of a system for additively manufacturing an object, in accordance with an embodiment of the present invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. The term "real-time," as used herein, means a level of processing responsiveness that a user senses as sufficiently immediate or that enables the processor to keep up with an external process.

Additionally, while the embodiments disclosed herein are described with respect to additive manufacturing, it is to be understood that embodiments of the present invention are equally applicable to other processes and/or devices in which an object needs to be removed from a substrate upon which it was formed/built.

Referring now to FIG. 1, the major components of a system 10 for additively manufacturing an object 12 are shown. The system 10 includes a substrate 14 having a sacrificial layer 16 disposed on a base layer 18, a mobile print head 20, and a controller 22 having at least one processor 24 and a memory device 26. In embodiments, the system 10 may further include a gantry 28 with a mobile arm 30 that facilitates movement of the mobile print head 20. The controller 22 is in electronic communication with the mobile print head 20, and/or the mobile arm 30, and is operative to form the object 12 on the sacrificial layer 16 via the mobile print head 20 such that the object 12 is secured to the base layer 18 via the sacrificial layer 16. As will be appreciated and explained in greater detail below, at least some, e.g., a portion 32 (FIGS. 6 and 7), of the sacrificial layer 16 is configured to be removed from the substrate 14 such that the object 12 is no longer secured to the base layer 18.

In certain aspects, the mobile print head 20 may include one or more nozzles 34 through which one or more forming materials and/or binding materials may be dispersed. In embodiments, the forming materials may be at least one of a metal, plastic, and/or any other material suitable for constructing the object 12. The mobile print head 20 may be moveably connected to the mobile arm 30, which in turn may be moveable connected to the gantry 28. As will be appreciated, while FIG. 1 depicts the mobile arm 30 disposed on the gantry 28, it will be understood that, in embodiments, the mobile arm 30 may not be disposed on the gantry 28. For example, the mobile arm 30 may have a base structure secured to the ground and/or other stationary structure. It will also be understood that other embodiments of the invention may move the substrate 14 in relation to a stationary print head.

Figure 2:
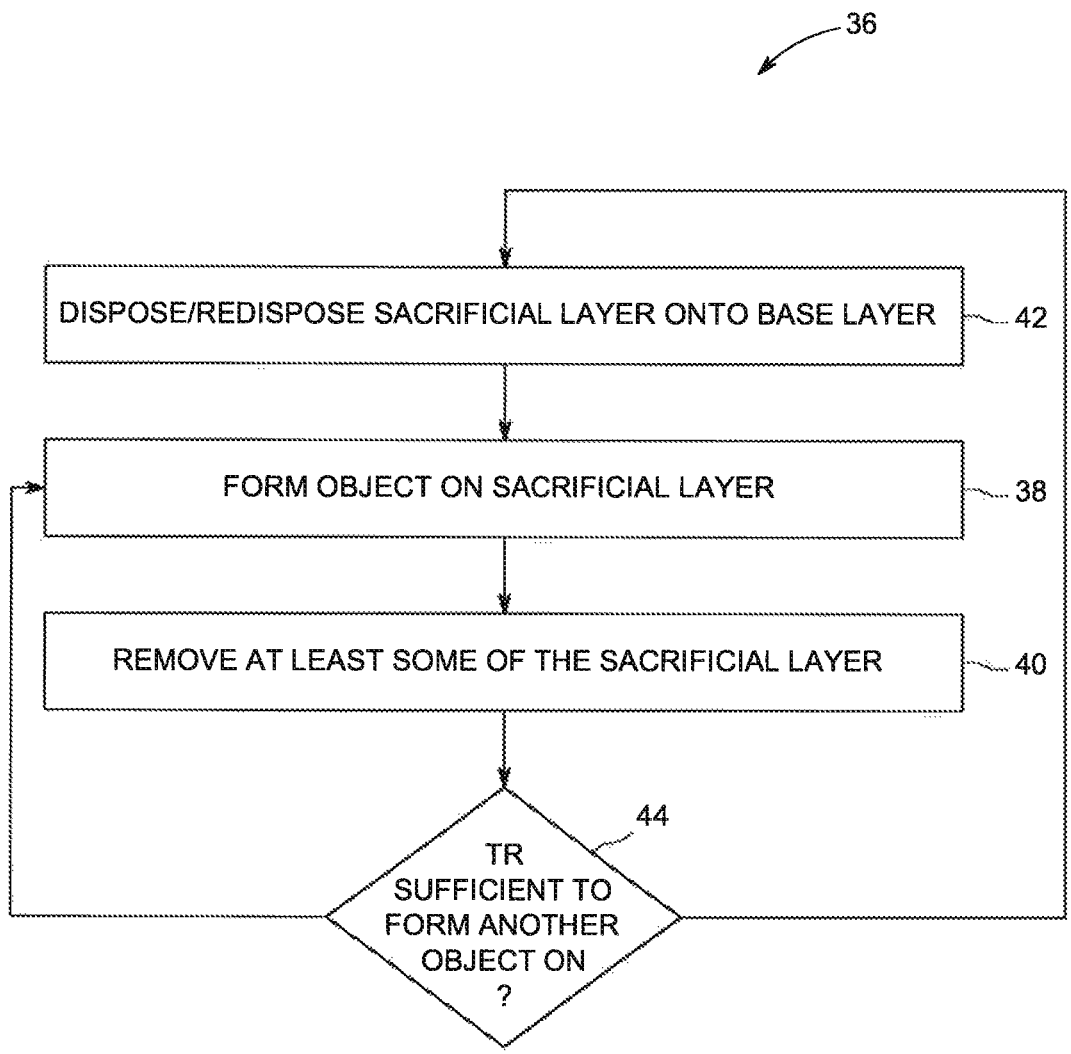
FIG. 2 is a flowchart depicting a method for additively manufacturing an object utilizing the system of FIG. 1, in accordance with an embodiment of the present invention.

Turning now to FIG. 2, a flowchart depicting a method 36 for additively manufacturing the object 12 (FIG. 1) utilizing the system 10 (FIG. 1) is shown. The method includes forming 38 the object 12 on the sacrificial layer 16 (FIG. 1) such that the object 12 is secured to the base layer 18 (FIG. 1) via the sacrificial layer 16, and removing 40 at least some, e.g., portion 32 (FIGS. 6 and 7), of the sacrificial layer 16 from the substrate 14 so that the object 12 is no longer secured to the base layer 18. In embodiments, the method may further include disposing 42 the sacrificial layer 16 onto the base layer 18, forming 38, 44 a second object on a portion 46 (FIGS. 6 and 7) of the sacrificial layer 16 remaining disposed on the base layer 18 after removal 40 of portion 32, i.e., after separation of the first object 12 from the base layer 18 as best seen in FIG. 7, and/or redisposing 42, 44 the sacrificial layer 16 onto the base layer 18.

Figure 3:
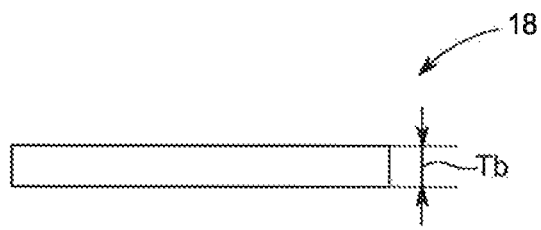
FIG. 3 is a diagram of a base layer of a substrate of the system of FIG. 1, in accordance with an embodiment of the present invention.

As shown in FIG. 3, in embodiments, the base layer 18 may be a structure sufficient to operate as/provide a foundation upon which to form the object 12, i.e., in embodiments, the base layer 18 is operative to provide structural integrity to the substrate 14 while the object 12 is secured to the base layer 18 via the sacrificial layer 16. For example, in embodiments, the base layer 18 may have a thickness Tb configured to mitigate the effects of thermal stresses within the object 12 (FIG. 1) resulting from the cooling of the printed 2D layers of the object 12 over time. In certain aspects, Tb may be between about three (3) to four (4) centimeters. As will be understood, the base layer 18 is depicted in FIG. 3 without the sacrificial layer 16. Accordingly, the sacrificial layer 16 may be disposed 42 (FIG. 2) onto the base layer 18 such that the sacrificial layer 16 is bonded and/or joined to the base layer 18.

Figure 4:
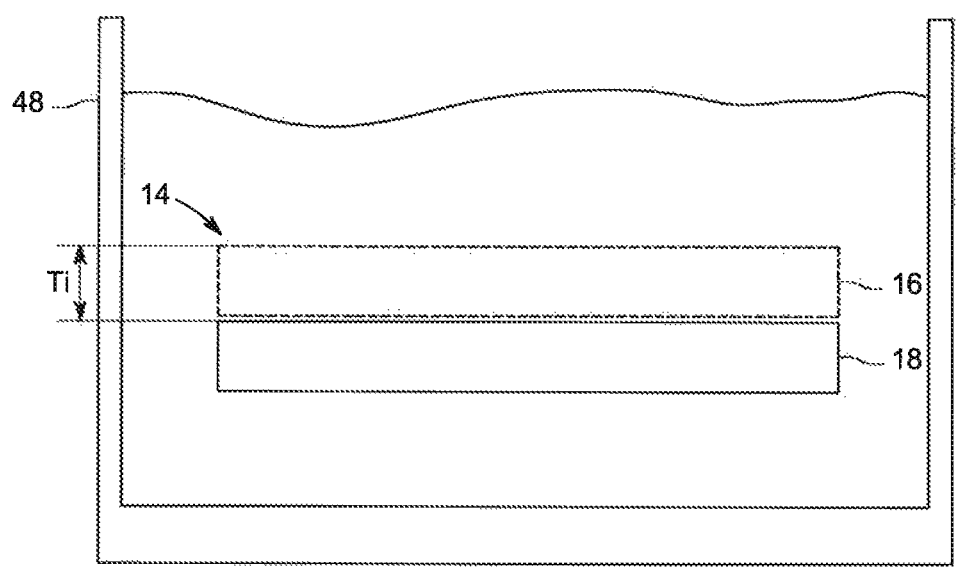
FIG. 4 is a diagram of a sacrificial layer being disposed onto the base layer of FIG. 3, in accordance with an embodiment of the present invention.
Figure 5:
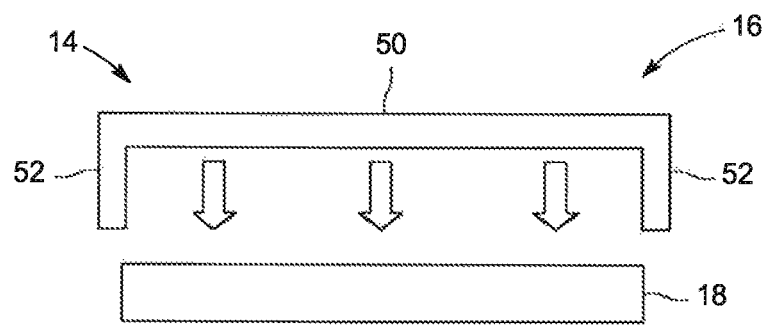
FIG. 5 is another diagram of a sacrificial layer being disposed onto the base layer of FIG. 3, in accordance with an embodiment of the present invention.

For example, as illustrated in FIG. 4, the base layer 18 may be placed into a tank 48 so that the sacrificial layer 16 (depicted in dashed lines to represent ongoing formation/buildup) may be plated onto the base layer 18 via electroplating and/or electroless plating. As will be appreciated, however, the sacrificial layer 16 may be disposed 42 onto the base layer 18 via other methods suitable for bonding and/or joining two materials together, e.g., sintering, welding, and/or brazing. Accordingly, in embodiments, the sacrificial layer 16 may be formed from at least one of copper, nickel, tin, and/or steel; and the base layer 18 may be formed from at least one of stainless steel and copper. As shown in FIG. 5, in embodiments, the sacrificial layer 16 may be physically independent of the base layer 18, i.e., not bonded and/or not joined to the base layer 18 at the molecular level. For example, the sacrificial layer 16 may be a cover having a base portion 50 and sidewalls 52 configured to fit over the base layer 18.

Referring back to FIG. 1, forming 38 (FIG. 2) the object 12 may be accomplished by placing the substrate 14, having the sacrificial layer 16 disposed on the base layer 18, within the system 10, as shown in FIG. 1. A 3D model of the object 12 may then be loaded into the memory 26 of the controller 22, which in turn directs the mobile print head 20 to form the object 12 on the sacrificial layer 16 via printing a plurality of 2D layers on top of each other. Embodiments of the invention may join the 2D layers of the object 12 together via a binding material, sintering the layers together via a laser, and/or other suitable methods. In other embodiments, the system 10 may use a rake to spread powdered forming material on the substrate 14, and the mobile print head 20 may be a mobile and/or stationary laser that prints the 2D layers by sintering the powdered forming material, e.g., Direct Melt Laser Sintered additive manufacturing. As will be understood, the object 12 is formed by the mobile print head 20 such that the object 12 is attached and/or bonded to the sacrificial layer 16, which in turn secures the object 12 to the base layer 18.

Figure 6:
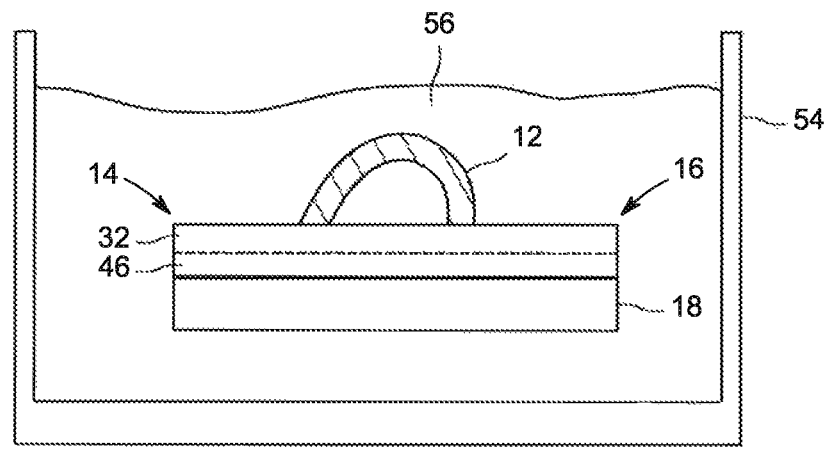
FIG. 6 is a diagram depicting the removal of at least some of the sacrificial layer from the substrate of FIG. 1, in accordance with an embodiment of the present invention.
Figure 7:
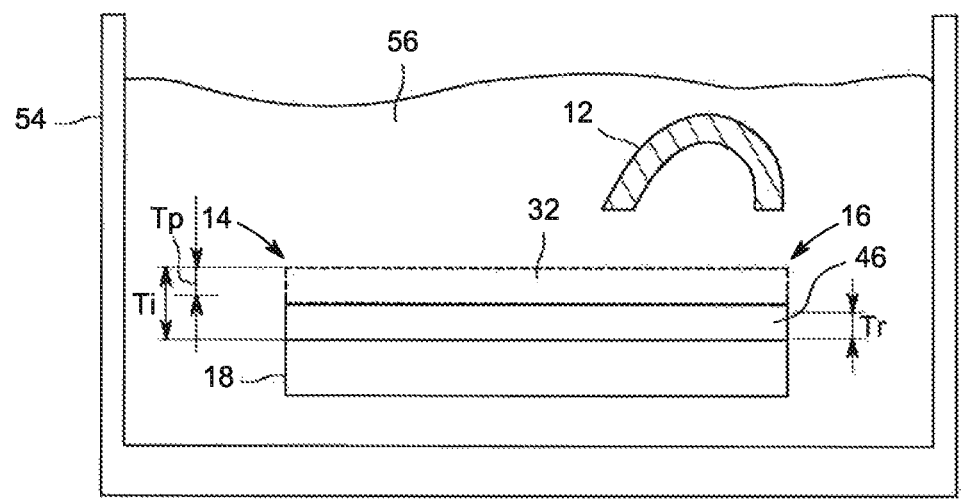
FIG. 7 is a diagram depicting the object of FIG. 1 separated from the substrate of FIG. 1, in accordance with an embodiment of the present invention.

Moving now to FIG. 6, removal 40 (FIG. 2) of the portion 32 from the substrate may be accomplished via an etching device 54 which may form part of the system 10. For example, in embodiments, the etching device 54 may be a tank containing an etchant 56, e.g., sulfuric acid, nitric acid, hydrochloric acid, and/or super-saturated aluminum, into which the substrate 14 and secured object 12 are placed. As shown in FIG. 7, the etching device 54 removes the portion 32 (shown completely dashed out to represent removal from substrate 14) of the sacrificial layer 16 such that the object 12 is no longer secured to the base layer 18. In certain aspects, voltage differentials may be applied between the object 12 and the etching device 54 to aid in the removal of the portion 32. In embodiments, the etching device 54 may be a wash station, as opposed to a tank, wherein the etchant is disposed onto the sacrificial layer 16 via a nozzle and/or hose.

As will be understood, the proportion/ratio of the removed portion 32 to the whole of the sacrificial layer 16 may vary. In other words, a thickness $T_p$ of the removed portion 32 contributes to an initial thickness $T_i$ of the sacrificial layer 16. For example, in embodiments, the portion 32 may include the entirely of the sacrificial layer 16 such that the sacrificial layer 16 is completely consumed during a single removal/etching 40 (FIG. 2), i.e., $T_p$ is equal to $T_i$. In such embodiments, the initial thickness $T_i$ of the sacrificial layer 16 may be between about ten (10) microns to about one hundred (100) microns. Once the sacrificial layer 16 has been consumed via removal 40, the sacrificial layer 16 may be redisposed 42 (FIG. 2) onto the base layer 18 in the same manner that the sacrificial layer 16 was first disposed 42 (FIG. 2) onto the base layer 18.

In other embodiments, however, the initial thickness $T_i$ of the sacrificial layer 16 may allow the sacrificial layer 16 to last for a plurality of removals/etchings 40. In other words, the thickness $T_p$ of the removed portion 32 is less than the initial thickness Ti of the sacrificial layer 16. In such embodiments, the initial thickness $T_i$ of the sacrificial layer 16 may be between about ten (10) microns to about one hundred (100) microns, and the thickness $T_p$ of the removed portion 32 may be between about five (5) microns to about ninety-five (95) microns. Thus, as shown by block 44 (FIG. 2), if the thickness $T_r$ (FIG. 7) of the remaining portion 46 is sufficient to undergo another round/cycle of removal 40, i.e., $T_r$ is thick enough to form 38 another object onto so as to secure the object to the base layer 18 without the object being formed on/joined to the base layer 18, another object (similar to object 12) may be formed 38 (FIG. 2) on the substrate 14. If, however, $T_r$ is not sufficient to undergo another round/cycle of removal 40, then the sacrificial layer 16 may be redisposed 42 onto the base layer 18 in the same manner that the sacrificial layer 16 was first disposed 42 onto the base layer 18. Accordingly, the substrate 14 may be repeatedly used to form 38 objects until the sacrificial layer 16 needs to be replenished/redisposed 42.

Finally, it is also to be understood that the imaging system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be accomplished in real-time. For example, as previously mentioned, the system may include at least one processor and system memory/data storage structures, which may include random access memory (RAM) and read-only memory (ROM). The at least one processor of the system may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. The term "computer-readable medium," as used herein, refers to any medium that provides or participates in providing instructions to the at least one processor of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a method for additively manufacturing an object is provided. The method includes forming the object on a sacrificial layer of a substrate such that the object is secured to a base layer of the substrate via the sacrificial layer. The method further includes removing at least some of the sacrificial layer from the substrate so that the object is no longer secured to the base layer. In certain embodiments, the method further includes disposing the sacrificial layer onto the base layer. In certain embodiments, the sacrificial layer is physically independent of the base layer. In certain embodiments, disposing the sacrificial layer onto the base layer includes at least one of: plating the sacrificial layer onto the base layer; sintering the sacrificial layer onto the base layer; welding the sacrificial layer to the base layer; brazing the sacrificial layer to the base layer; and adhesively joining the sacrificial layer to the base layer. In certain embodiments, the sacrificial layer is formed from at least one of copper, nickel, tin, and steel. In certain embodiments, the base layer is formed from at least one of stainless steel and copper. In certain embodiments, removing at least some of the sacrificial layer from the substrate includes etching the sacrificial layer via an etchant. In certain embodiments, the etchant is at least one of sulfuric acid, nitric acid, hydrochloric acid, and super-saturated aluminum. In certain embodiments, a portion of the sacrificial layer remains disposed on the base layer after the object is no longer secured to the substrate. In such embodiments, the method further includes forming a second object on the portion such that the second object is secured to the base layer via the portion, and removing at least some of the portion from the substrate such that the second object is no longer secured to the base layer. In certain embodiments, the method further includes redisposing the sacrificial layer onto the base layer. In certain embodiments, the object is formed at least in part from a metal.

Other embodiments provide for a system for additively manufacturing an object. The system includes a substrate, a mobile print head, and a controller. The substrate includes a sacrificial layer disposed on a base layer and is operative to provide a foundation upon which to form the object. The mobile print head is operative to move in relation to the substrate. The controller is in electronic communication with the print head and operative to form the object on the sacrificial layer via the mobile print head such that the object is secured to the base layer via the sacrificial layer. At least some of the sacrificial layer is configured to be removed from the substrate such that the object is no longer secured to the base layer. In certain embodiments, the sacrificial layer is physically independent of the base layer. In certain embodiments, the sacrificial layer is at least one of: plated to the base layer; sintered to the base layer; welded to the base layer; brazed to the base layer; and adhesively joined to the base layer. In certain embodiments, the sacrificial layer is formed from at least one of copper, nickel, tin, and steel. In certain embodiments, the base layer is formed from at least one of stainless steel and copper. In certain embodiments, the system further includes an etching device operative to remove the sacrificial layer via an etchant. In certain embodiments, the etchant is at least one of sulfuric acid, nitric acid, hydrochloric acid, and super-saturated aluminum.

Yet still other embodiments provide for a non-transitory computer readable medium storing instructions. The stored instructions are configured to adapt a controller to form an object on a sacrificial layer of a substrate via a print head in electronic communication with the controller such that the sacrificial layer secures the object to a base layer of the substrate, and to remove a portion of the sacrificial layer from the substrate via an etching device in electronic communication with the controller. The object is no longer secured to the base layer when the portion of the sacrificial layer has been removed from the substrate. In certain embodiments, the stored instructions are configured to further adapt the controller to dispose the sacrificial layer onto the base layer.

Yet still other embodiments provide for a substrate for additively manufacturing an object. The substrate includes a base layer operative to provide a foundation upon which to form the object, and a sacrificial layer disposed on the base layer and operative to secure the object to the base layer. At least some of the sacrificial layer is configured to be removed from the substrate such that the object, after having been formed, is no longer secured to the base layer.

Accordingly, as will be appreciated, by providing for non-mechanical separation of an additively manufactured object from a substrate, some embodiments of the present invention provide for an additively manufacturing method which does not require the substrate to be cleaned after each use. Accordingly, some embodiments of the invention provide for a faster additive manufacturing method having reduced costs as compared to traditional methods, which often require a substrate to be cleaned after each use.

Further, as the method of non-mechanical separation of an additively manufactured object from a substrate, disclosed herein, may be performed without breaking, cutting, and/or otherwise invoking a mechanical separation processes, some embodiments of the present invention provide for a method of separating a completed additively manufactured object form a substrate without requiring substantial finishing, e.g., grinding, buffering, smoothing to the object to place the part in conformance with its specified dimensions. As will be appreciated, such embodiments may also provide for reductions in costs and/or time for additively manufacturing objects. For example, some embodiments of the present invention may provide for a reduction in the amount of forming material used to manufacture a single object, as in some embodiments, the object is removed from a substrate without the use of a foundation segment.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A method for additively manufacturing an object comprising:
   electroplating or electroless plating a sacrificial layer onto a base layer of a substrate;
   additively forming the object on the sacrificial layer of the substrate such that the object is secured to the base layer of the substrate via the sacrificial layer; and
   removing at least some of the sacrificial layer from the base layer of the substrate so that the object is no longer secured to the base layer by placing the object, the sacrificial layer, and the substrate including the base layer into a tank having an etchant disposed in the tank.

2. The method of claim 1, wherein the sacrificial layer is formed from at least one of copper, nickel, tin, or steel.

3. The method of claim 1, wherein the base layer is formed from at least one of stainless steel or copper.

4. The method of claim 1, wherein the etchant is sulfuric acid.

5. The method of claim 1, wherein the object is a first object and a portion of the sacrificial layer remains disposed on the base layer after the first object is no longer secured to the substrate, and the method further comprises:
   forming a second object on the portion such that the second object is secured to the base layer via the portion; and
   removing at least some of the portion from the substrate such that the second object is no longer secured to the base layer.

6. The method of claim 1, wherein the sacrificial layer is a first sacrificial layer, and further comprising:
   redisposing a second sacrificial layer onto the base layer.

7. The method of claim 1, wherein the object is formed at least in part from a metal.

8. The method of claim 1, wherein the etchant is at least one of nitric acid, hydrochloric acid, or super-saturated aluminum.

9. The method of claim 1, wherein removing at least some of the sacrificial layer from the substrate includes applying a voltage differential between the object and the tank while the object, the sacrificial layer, and the substrate are in the tank with the etchant.

10. A method comprising:
    electroplating a sacrificial layer onto a base layer of a substrate;
    additively forming an object on the sacrificial layer of the substrate such that the object is secured to the base layer of the substrate via the sacrificial layer;
    placing the object, the sacrificial layer, and the substrate including the base layer into a tank having an etchant disposed in the tank;
    applying a voltage differential between the object and the tank while the object, the sacrificial layer, and the substrate are in the tank with the etchant; and
    removing at least some of the sacrificial layer from the base layer of the substrate using the etchant so that the object is no longer secured to the base layer.

11. The method of claim 10, wherein the sacrificial layer is formed from at least one of copper, nickel, tin, or steel.

12. The method of claim 10, wherein the base layer is formed from at least one of stainless steel or copper.

13. The method of claim 10, wherein the etchant is sulfuric acid.

14. The method of claim 10, wherein the object is a first object and a portion of the sacrificial layer remains disposed on the base layer after the first object is no longer secured to the substrate, and further comprising:
    forming a second object on the portion such that the second object is secured to the base layer via the portion; and
    removing at least some of the portion from the substrate such that the second object is no longer secured to the base layer.

15. The method of claim 10, wherein the sacrificial layer is a first sacrificial layer, and further comprising:
    redisposing a second sacrificial layer onto the base layer.

16. The method of claim 10, wherein the object is formed at least in part from a metal.

17. The method of claim 10, wherein the etchant is at least one of nitric acid, hydrochloric acid, or super-saturated aluminum.

18. A method comprising:
    electroplating a sacrificial layer onto a base layer;
    additively forming the object on the sacrificial layer such that the object is secured to the base layer via the sacrificial layer; and
    removing at least some of the sacrificial layer from the base layer by directing an etchant onto the sacrificial layer so that the object is no longer secured to the base layer.

19. The method of claim 18, wherein the etchant is directed onto the sacrificial layer using one or more of a hose or a nozzle.

20. The method of claim 18, wherein the object is a first object and a portion of the sacrificial layer remains disposed on the base layer after the first object is no longer secured to the base layer, and further comprising:
    forming a second object on the portion such that the second object is secured to the base layer via the portion; and
    removing at least some of the portion from the base layer such that the second object is no longer secured to the base layer.

* * * * *